(12) United States Patent
Mukthiyar et al.

(10) Patent No.: US 11,952,543 B2
(45) Date of Patent: Apr. 9, 2024

(54) PROCESS FOR PRODUCING HYDROGEN AND LIGHT OLEFINS FROM RESID FLUID CATALYTIC CRACKING

(71) Applicant: Indian Oil Corporation Limited, Mumbai (IN)

(72) Inventors: Sadhullah Mukthiyar, Faridabad (IN); Gadari Saidulu, Faridabad (IN); Manoj Kumar Bhuyan, Faridabad (IN); Kamlesh Gupta, Faridabad (IN); Madhusudan Sau, Faridabad (IN); Gurpreet Singh Kapur, Faridabad (IN); Sankara Sri Venkata Ramakumar, Faridabad (IN)

(73) Assignee: INDIAN OIL CORPORATION LIMITED, Mumbai (IN)

( * ) Notice: Subject to any disclaimer, the term of this patent is extended or adjusted under 35 U.S.C. 154(b) by 712 days.

(21) Appl. No.: 17/094,966

(22) Filed: Nov. 11, 2020

(65) Prior Publication Data

US 2021/0139794 A1 May 13, 2021

(30) Foreign Application Priority Data

Nov. 11, 2019 (IN) .............................. 201921045807

(51) Int. Cl.
*C10G 55/06* (2006.01)
*B01J 29/08* (2006.01)
(Continued)

(52) U.S. Cl.
CPC ............ *C10G 55/06* (2013.01); *B01J 29/088* (2013.01); *B01J 29/405* (2013.01); *B01J 35/08* (2013.01);
(Continued)

(58) Field of Classification Search
CPC .............. C10G 55/06; C10G 2300/107; C10G 2300/1077; C10G 2203/202; C10G 2203/205; C10G 2203/4018; C10G 2400/20; B01J 29/088; B01J 29/405; B01J 35/08; B01J 38/02; C01B 3/40;
(Continued)

(56) References Cited

U.S. PATENT DOCUMENTS 3,303,123 A * 2/1967 Payton .................. C10G 11/00
208/164
5,846,402 A 12/1998 Mandal et al.
(Continued)

FOREIGN PATENT DOCUMENTS

CN          103773425 A       5/2014
WO      WO2018163107     *   9/2018

OTHER PUBLICATIONS

Machine translation of CN 103773425 Zhang et al. pp. 1-16 (Year: 2014).*

(Continued)

*Primary Examiner* — Douglas B Call
(74) *Attorney, Agent, or Firm* — Workman Nydegger

(57) ABSTRACT

The present invention relates to a process for production of high yield of hydrogen by carrying out the dry reforming of the dry gas generated from the process itself by utilizing the same catalyst for cracking and producing high yield of light olefins such as ethylene, propylene and butylenes from residue feedstocks.

9 Claims, 1 Drawing Sheet

(51) Int. Cl.
    *B01J 29/40*     (2006.01)
    *B01J 35/08*     (2006.01)
    *B01J 38/02*     (2006.01)
    *C01B 3/40*     (2006.01)
    *C01B 3/48*     (2006.01)
    *C01B 3/56*     (2006.01)

(52) U.S. Cl.
    CPC ................ *B01J 38/02* (2013.01); *C01B 3/40* (2013.01); *C01B 3/48* (2013.01); *C01B 3/56* (2013.01); *C01B 2203/0283* (2013.01); *C01B 2203/042* (2013.01); *C01B 2203/1241* (2013.01); *C10G 2300/107* (2013.01); *C10G 2300/1077* (2013.01); *C10G 2300/202* (2013.01); *C10G 2300/205* (2013.01); *C10G 2300/4018* (2013.01); *C10G 2400/20* (2013.01)

(58) Field of Classification Search
    CPC ..... C01B 3/48; C01B 3/56; C01B 2203/0283; C01B 2203/042; C01B 2203/1241
    USPC ........................................................ 423/655
    See application file for complete search history.

(56) References Cited

U.S. PATENT DOCUMENTS

| | | | |
|---|---|---|---|
| 6,179,993 | B1 | 1/2001 | Seimandi et al. |
| 9,783,744 | B2 | 10/2017 | Bhanuprasad et al. |
| 10,287,511 | B2 | 5/2019 | Kumar et al. |
| 2004/0073076 | A1 | 4/2004 | Drnevich et al. |
| 2006/0096890 | A1* | 5/2006 | Pankaj ................... C10G 11/18 208/113 |
| 2013/0248419 | A1* | 9/2013 | Abba ..................... C10G 69/00 208/67 |
| 2017/0129776 | A1 | 5/2017 | Mukthiyar et al. |
| 2017/0130150 | A1 | 5/2017 | Saidulu et al. |
| 2018/0078923 | A1* | 3/2018 | Herskowitz ............ B01J 23/005 |
| 2019/0316047 | A1* | 10/2019 | Al-Majnouni ......... C10G 11/10 |

OTHER PUBLICATIONS

Extended European Search Report, dated Mar. 15, 2021, from European Patent Application No. 20206377 filed Nov. 9, 2020.
India Examination Report, dated Jun. 9, 2021, from India Patent Application No. 201921045807 filed Nov. 11, 2019.

\* cited by examiner

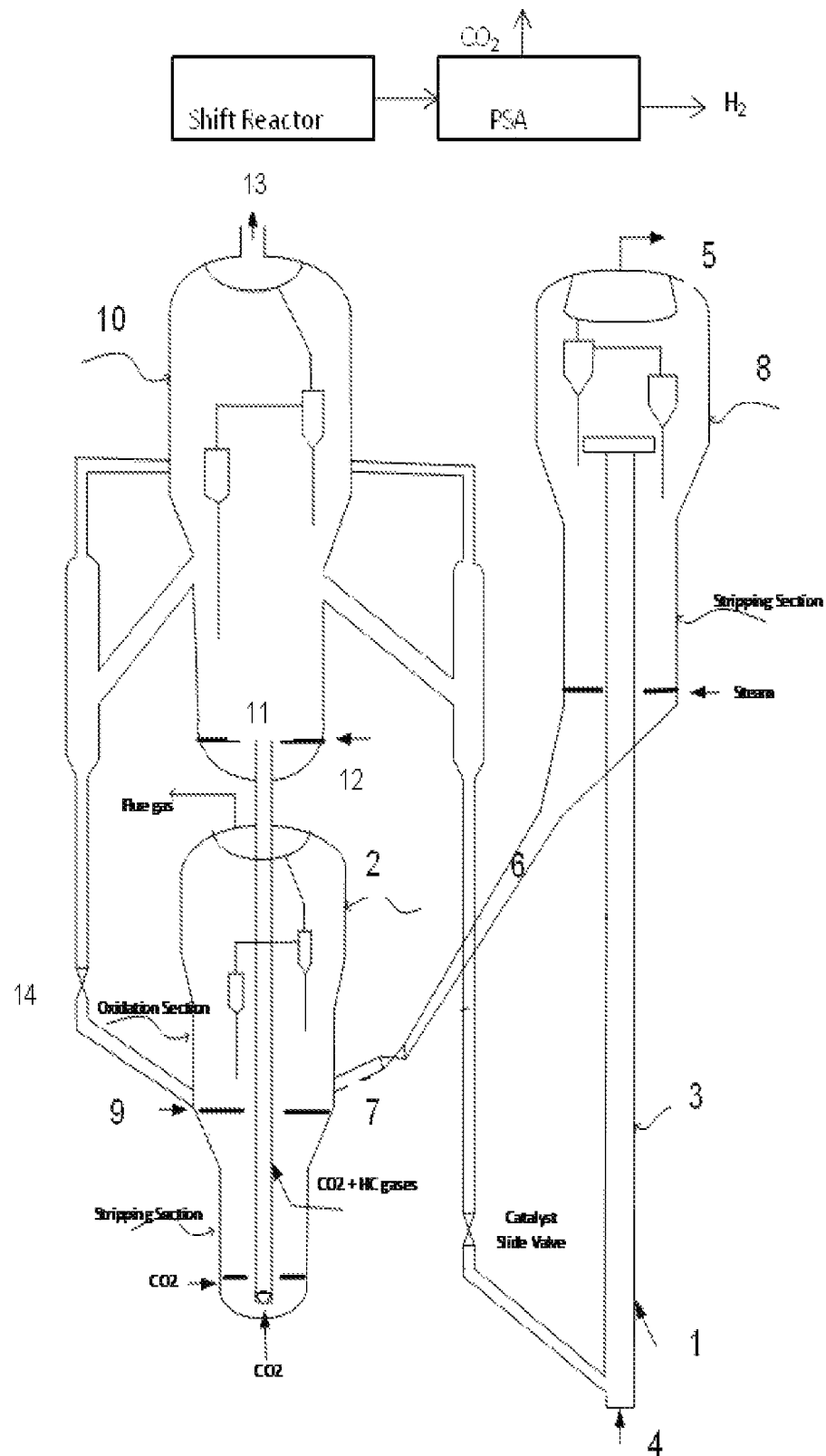

PROCESS FOR PRODUCING HYDROGEN AND LIGHT OLEFINS FROM RESID FLUID CATALYTIC CRACKING

FIELD OF THE INVENTION

The present invention relates to a process for conversion of residue hydrocarbon having a feed CCR of more than 5 wt % into high yields of hydrogen and light olefins in a riser reactor in presence of a multifunctional micro spherical catalyst. More, particularly, the present invention relates to the multifunctional micro spherical catalyst for cracking of hydrocarbons to light olefins as well as dry reforming of hydrocarbons gases.

BACKGROUND OF THE INVENTION

U.S. Pat. No. 9,783,744 provides a novel method of upgrading the residue feedstocks having a significant amount of Conradson Carbon residue (concarbon), metals, especially vanadium and nickel, asphaltenes, sulfur impurities and nitrogen to lighter and more valuable hydrocarbon products by reducing or minimizing coke formation and by injecting fine droplets of oil soluble organo-metallic compounds at multiple elevations of the riser with varying dosing rates.

US 20170130150 describes a process of increasing syngas/synthesis gas production during an up-gradation process of petroleum residual oil by circulation of rejuvenated upgrading material through a heat removal zone such as an Auxiliary Reformer and by regeneration of spent upgrading material. This application teaches regarding a method of generating the syngas through steam reforming of coke as well as steam reforming of hydrocarbons.

US 20170129776 provides a process for the production of high quality synthesis gas rich in hydrogen during the process of upgrading the residual hydrocarbon oil feedstock by rejuvenating the spent upgrading material in the reformer using steam, in the absence of air/oxygen and without supplying external heat source other than the heat generated inside the process during combustion of residual coke deposited on the upgrading material. Furthermore, the present invention also provides a system and method for preparing pure hydrogen from syngas.

U.S. Pat. No. 6,179,993 relates to a short contact time process for obtaining a substantial amount of olefinic products from a residual feedstock by use a bed of fluidized heat transfer solids. The vapor residence time is less than about 0.5 seconds in this process.

US20040073076 discloses a method of recovering olefins and for producing hydrogen from a refinery off-gas stream in which such stream is conventionally pretreated and separated to obtain a light ends stream that contains nitrogen, hydrogen and carbon monoxide and a heavy ends stream that contains the olefins. The light ends stream is subjected to reforming and a water gas shift reaction after addition of a natural gas stream. The addition of the natural gas increases the hydrogen recovery from the light ends and stabilizes the hydrocarbon content in the stream to be subjected to the reforming and water gas shift reactions. The heavy ends can be further treated to recover olefins such as ethylene and propylene.

U.S. Pat. No. 5,846,402 refers to selective catalytic cracking of a petroleum-based feedstock to produce a product having a high yield of liquefied petroleum gas (LPG) and light olefins having 3 to 4 carbons which includes providing a fluidized bed reactor in presence of catalyst containing y zeolite, pentasil zeolite and a bottom selective material. The reactor is operated at a Weight Hourly Space Velocity (WHSV) ranging from 40 to 120 a ratio of solid acidic catalyst to petroleum-based feedstock ranging from 15 to 25, a temperature at the top of the high velocity riser ranging from 530° C. to 600° C. The process produces an LPG yield ranging up to 40 to 65 wt. % of the fresh petroleum-based feedstock having a light olefin selectivity of at least 40 wt. %.

U.S. Pat. No. 10,287,511 describes a catalyst composition comprising 70-98% of a non-zeolitic material; and 2-30% of at least one zeolite material, the percentage being based on weight of the catalyst composition for catalytic cracking of hydrocarbons. It also describes a method of preparing the catalyst and a hardware configuration for cracking fresh hydrocarbons feed one reactor and cracking recycle feed in another reactor.

Many prior art references are available for production of hydrogen/syn gas through regeneration of coked spent catalyst/circulating solids and through steam reforming of coke/partial combustion of coke. However, in such cases, the activity of the catalyst gets destroyed in presence of steam and metal.

Also, most of the prior art processes describe the use of steam/air/pure oxygen to regenerate the catalyst as well as produce hydrogen through syngas formed in the steam gasification reaction. However, the drawbacks associated with the prior art processes are as follows:

The activity of the catalyst for cracking hydrocarbons to produce high yields of light olefins is virtually negligible when used with steam for regenerating the catalyst.

The cracking reaction produces very little desired products which can be directly used after treatment.

These processes invariably produce hydrocarbons which require secondary cracking to convert them into finished products.

The capital and operational cost is prohibitive in case of use of pure oxygen

The syngas quality is diluted with nitrogen when air is used as regenerating agent.

Therefore, there is a need of a process which produces high yields of hydrogen and light olefins by combining catalytic cracking, dry reforming, and water gas shift reaction and allows the catalyst to be recycled and reused.

OBJECTIVE OF THE PRESENT INVENTION

A primary objective of the present invention is to provide a process for producing high yields of hydrogen and light olefins from Resid fluid catalytic cracking.

A further objective of the present invention is to provide a process for conversion of residue hydrocarbon having a feed CCR of more than 5 wt % into high yields of hydrogen and light olefins having 2 to 4 carbons in a riser reactor in presence of a multifunctional micro spherical catalyst.

Yet another objective of the present invention is to provide a process to burn the excess coke in the regenerator which is utilized for supplying the heat for dry reforming reactions.

A further objective of the present invention is to provide a process for dry reforming of hydrocarbons to syngas which further gets converted to hydrogen in the presence of the regenerated catalyst.

Another objective of the present invention is to provide a dry reforming process for converting the fuel gases containing methane and ethane produced from the process or from any other sources to high value hydrogen.

A further objective of the present invention is to provide a process for reducing multifunctional catalyst before carrying out dry reforming reaction.

SUMMARY OF THE INVENTION

In one aspect, a process is provided for conversion of a residue hydrocarbon feedstock having a feed CCR of more than 5 wt % into hydrogen and light olefins comprising:
(a) cracking the residue hydrocarbon feedstock in a riser reactor in the presence of a multifunctional micro spherical catalyst from a reformer to obtain a reaction mixture comprising cracked hydrocarbons, hydrocarbon gases, hydrogen, and a coked catalyst,
(b) separating the coked catalyst and the cracked hydrocarbons obtained from step (a) at the end of the riser reactor and transferring the coked catalyst to a regenerator,
(c) sending the cracked hydrocarbons obtained after separation in step (b) to a main fractionator for fractionation,
(d) regenerating the coked catalyst of step (b) in upper part of the regenerator by burning carbon, hydrogen, sulfur, metals, and nitrogen deposits on the coked catalyst in presence of oxygen containing gases to obtain a regenerated catalyst,
(e) removing entrapped flue gas from the regenerated catalyst of step (d) at the lower part of the regenerator using $CO_2$ as a stripping medium to obtain a stripped catalyst,
(f) transferring the stripped catalyst of step (e) to a reformer via a transporting pipe or a lift line using $CO_2$ as a lifting medium,
(g) dry reforming the hydrocarbon gases to synthesis gas in the reformer using $CO_2$ and in presence of the stripped catalyst,
(h) recirculating the catalyst from the reformer to the riser reactor and to the upper part of the regenerator,
(i) sending the synthesis gas from step (g) to a shift reactor for converting carbon monoxide in the synthesis gas to carbon dioxide and hydrogen through water gas shift reaction; wherein the carbon dioxide, hydrogen and unconverted hydrocarbons are sent to a Pressure Swing Adsorption (PSA) unit for hydrogen separation and off-gas from the PSA unit is recycled back to the reformer;
wherein the cracked hydrocarbons consisting of $C_2$ to $C_4$ olefins is in a range of 20-40 wt % and total hydrogen yield is in a range of 2-6 wt % on a fresh hydrocarbon feedstock basis.

In another feature, the multifunctional micro spherical catalyst of step (a) consists of:
5 to 15 wt % of ultra-stable Y zeolite,
2-10 wt % of pentasil zeolite which is shape selective,
1-5 wt % of active material which is bottom selective,
0.1-2 wt % of rare earth component and
60-85 wt % of support material;
wherein the wt % is based on the total weight of the catalyst.

In yet another feature, the cracking of residue hydrocarbon feedstock in step (a) is carried out at a temperature in a range of 550-650° C., a weight hourly space velocity (WHSV) in a range of 40-100 hr$^{-1}$, a catalyst to hydrocarbons ratio in a range of 10 to 25 wt/wt, a pressure in a range of 1 to 5 kg/cm$^2$g and a steam to hydrocarbon ratio of 0.1 to 1.0 wt/wt.

In a further feature, the dry reforming of hydrocarbon gases to synthesis gas in step (g) is carried out at a temperature in a range of 650-800° C. and WHSV in a range of 0.5-10 hr$^{-1}$.

In another feature, the hydrocarbon gases used for dry reforming are methane, ethane, or natural gas.

In another feature, the catalyst from the reformer is recirculated to riser reactor for cracking of hydrocarbons and to the upper part of the regenerator to control the regenerator catalyst temperature.

In one feature, synthesis gas or fuel gas is injected at the middle of the transporting line or lift line of step (f) for reducing the oxidation state of metals present on the catalyst.

In one feature, the regenerated catalyst is recirculated to the riser reactor for cracking of hydrocarbons and for stripping.

In yet another feature, the temperature of the regenerator is 50 to 100° C. higher compared to the temperature in the reformer.

BRIEF DESCRIPTION OF THE DRAWINGS

FIG. 1: illustrates the process for conversion of a residue hydrocarbon feedstock into hydrogen and light olefins

DETAILED DESCRIPTION OF THE INVENTION

Those skilled in the art will be aware that the present disclosure is subject to variations and modifications other than those specifically described. It is to be understood that the present disclosure includes all such variations and modifications. The disclosure also includes all such steps of the process, features of the product, referred to or indicated in this specification, individually or collectively, and any and all combinations of any or more of such steps or features.

The present disclosure is not to be limited in scope by the specific embodiments described herein, which are intended for the purposes of exemplification only. Functionally-equivalent products and methods are clearly within the scope of the disclosure, as described herein.

Accordingly, the present invention provides a process for conversion of residue hydrocarbon feedstock having a feed CCR (Conradson carbon residue) of more than 5 wt % into high yields of hydrogen and light olefins having 2 to 4 carbons in a riser reactor in presence of a multifunctional micro spherical catalyst.

In one embodiment, the present invention provides a process for conversion of a residue hydrocarbon feedstock having a feed CCR of more than 5 wt % into high yield of light olefins having 2 to 4 carbons through cracking of the residue hydrocarbon feedstock.

In yet another embodiment, the present invention provides a process for conversion of a hydrocarbon fuel gases ranging from $C_1$ and $C_2$ saturate to high yield of hydrogen.

In one preferred embodiment, as illustrated in FIG. 1, the residue hydrocarbon feedstock [1] is contacted with a multifunctional micro spherical catalyst from a reformer in a riser reactor [3] along with steam [4] to produce a reaction mixture comprising cracked hydrocarbons, hydrocarbon gases, hydrogen, and a coked catalyst. The cracked hydrocarbons [5] and the coked spent catalyst get separated at the end of the riser using a suitable separation device. The use of the separation device at the end of the riser is not limited to the invention. The coked spent catalyst is then transferred through a spent catalyst standpipe [6] to the regenerator. The catalyst flow to the regenerator is controlled through a catalyst slide valve [7] placed in the standpipe. The cracked hydrocarbons after separation at the end of the riser reactor [8] is then sent to main fractionator for separating hydrocarbon products of desired range. The coke deposited on the spent catalyst is removed in the regenerator by burning it off using oxygen containing gases such as air [9] or oxygen to obtain a regenerated catalyst. The entrapped flue gas from the regenerated catalyst is removed in the stripping section of the regenerator using $CO_2$ as stripping medium. The stripped catalyst is transported via a lifting line [11] using $CO_2$ as lifting medium to a reformer [10] for carrying out dry reforming of hydrocarbons. The hydrocarbon gases which predominantly consists of methane and ethane is dry reformed in a reformer using $CO_2$ containing gases in presence of stripped catalyst coming out of the regenerator. The hydrocarbon and $CO_2$ gas source is the off gas from the hydrogen separation step. The source of $CO_2$ gas is not limited to the hydrocarbon gas generated within the process, but also includes hydrocarbon gas from any other source such as refinery, natural gas etc. The hydrocarbon and $CO_2$ containing gases [12] get converted to synthesis gas [13] in the reformer. The catalyst from the reformer is recirculated to the regenerator and to the riser reactor. The catalyst flow to the regenerator is regulated through a catalyst slide valve [14]. The synthesis gas from the reformer is sent to a shift reactor for conversion of carbon monoxide to carbon dioxide and hydrogen through water gas shift reaction. The carbon dioxide, hydrogen and unconverted hydrocarbons are then sent to a Pressure Swing Adsorption (PSA) unit for hydrogen separation. The off gas from the PSA unit is sent back to the reformer.

In another embodiment, the present invention provides a process for conversion of a residue hydrocarbon feedstock, wherein the cracking of the residue hydrocarbon feedstock as well as dry reforming of hydrocarbons gases is carried out in the presence of a multifunctional micro spherical catalyst consisting of:

5 to 15 wt % of ultra-stable Y zeolite,
2-10 wt % of pentasil zeolite which is shape selective,
1-5 wt % of active material which is bottom selective,
0.1-2 wt % of rare earth component and
60-85 wt % of support material
wherein the wt % is based on the total weight of the catalyst.

In yet another embodiment, the present invention provides a process for conversion of a residue hydrocarbon feedstock, wherein the rare earth component in the catalyst is selected from a group consisting of lanthanum and cerium compounds.

In an embodiment, the present invention provides a process for conversion of a residue hydrocarbon feedstock, wherein the support material in the catalyst is selected from a group consisting of silica, alumina, and peptized alumina.

In an embodiment, the present invention provides a process for cracking of the residue hydrocarbon feedstock at a temperature in a range of 550-650° C., a weight hourly space velocity (WHSV) in a range of 40-100 $hr^{-1}$, a catalyst to hydrocarbon ratio in a range of 10-25 wt/wt, a pressure in a range of 1 to 5 $kg/cm^2g$ and a steam to hydrocarbon ratio of 0.1 to 1.0 wt/wt.

In an embodiment, the catalyst from the reformer is recirculated to riser reactor for cracking of hydrocarbons and to the upper part of the regenerator to control the regenerator catalyst temperature.

In another embodiment, the present invention provides a process for conversion of a residue hydrocarbon feedstock, wherein the resultant reaction mixture shall consist of cracked hydrocarbons having total light olefins ($C_2$, $C_3$ and $C_4$ containing olefins) in a range of 20-40 wt %.

In yet another embodiment, the present invention provides a process for conversion of a residue hydrocarbon feedstock, wherein the other hydrocarbon gaseous products produced in the cracking process such as methane and ethane, are converted to syngas. The liquid cracked hydrocarbons produced in the process are fractionated as per the desired cut range. The liquid products have the boiling points in a range of $C_5$ to 200, 200 to 360 and 360+. The catalyst gets deactivated during the cracking step due to deposition of coke. The coke consists of carbon, hydrogen, sulfur, nitrogen, and metals (Ni, Na, V, Fe, and other trace metals present in the feedstock).

According to this embodiment, the present invention provides a process for the separation of coked catalyst from the cracked hydrocarbon at the end of the cracking step in reactor. The lower part of reactor is used as stripper to strip off the entrapped hydrocarbons from the catalyst using steam.

In this embodiment, the present invention also provides a process for regeneration of coked catalyst in the regenerator. The coked catalyst containing carbon, hydrogen, sulfur, and nitrogen deposits is burnt in the upper part of the regenerator (oxidizing section) in presence of oxygen containing gases at a temperature of 700-850° C. for regenerating the catalyst. The metal deposits remain on the regenerated catalyst and get accumulated during each cycle. The entrapped flue gas from the regenerated catalyst is removed at the lower part of the regenerator (stripping section) using $CO_2$ as stripping medium. The stripped catalyst is transported to reformer using $CO_2$ as lifting medium. Synthesis gas and or fuel gas is injected at the middle of the transporting pipe or lift line. These gases act as reducing agent for reducing the oxidation state of the metals present on the catalyst. The total metals are in a range of 1 wt % to 3 wt % on the catalyst. Fresh catalyst is added to the regenerator in order to maintain the desired metal levels on the catalyst. The coke burning step is an exothermic reaction and the heat produced during this step is partly utilized in cracking and reformer steps.

In an embodiment, the present invention provides a process for conversion of a residue hydrocarbon feedstock, wherein the dry reforming of hydrocarbon gases to synthesis gas is carried out at a temperature in a range of 650-800° C. and WHSV in a range of 0.5-10 $hr^{-1}$.

During the process, the catalyst temperature comes down due to the endothermic reaction of dry reforming. The catalyst is recirculated to the cracking step and to oxidation section of regenerator to control the regenerator temperature, which is 50 to 100° C. higher compared to reformer.

According to the embodiment, the CO present in the synthesis gas produced in the reformer is further converted to $CO_2$ and $H_2$ through water gas shift reaction. The $CO_2$ produced in the water gas shift reaction is recycled back to the reformer. The unconverted hydrocarbons are also recycled back to the reformer. The overall hydrogen yield produced based on the fresh hydrocarbon feedstock basis including hydrogen produced in cracking step is in a range of 2-6 wt % on fresh feedstock basis.

In yet another embodiment, the residue hydrocarbon feedstock [1] is contacted with the regenerated catalyst from a regenerator [2] in a riser reactor [3] along with steam [4] to produce a reaction mixture comprising cracked hydrocarbons, hydrocarbon gases, hydrogen, and a coked catalyst. The cracked hydrocarbons [5] and the coked spent catalyst get separated at the end of the riser using a suitable separation device. The use of the separation device at the end of the riser is not limited to the invention. The coked spent catalyst is then transferred through a spent catalyst standpipe [6] to the regenerator. The catalyst flow to the regenerator is controlled through a catalyst slide valve [7] placed in the standpipe. The cracked hydrocarbons after separation at the end of the riser reactor [8] is then sent to main fractionators for separating hydrocarbon products of desired range. The coke deposited on the spent catalyst is removed in the regenerator by burning it off using oxygen containing gases such as air [9] or oxygen to obtain a regenerated catalyst. The regenerated catalyst is recirculated to the riser reactor for carrying out cracking of residue hydrocarbons and for stripping. The entrapped flue gas from the regenerated catalyst is removed in the stripping section of the regenerator using $CO_2$ as stripping medium. The stripped catalyst is transported via a lifting line [11] using $CO_2$ as lifting medium to a reformer [10] for carrying out dry reforming of hydrocarbons. The hydrocarbon gases which predominantly consists of methane and ethane is dry reformed in a reformer using $CO_2$ containing gases in presence of stripped catalyst coming out of the regenerator. The hydrocarbon and $CO_2$ gas source is the off gas from the hydrogen separation step. The source of $CO_2$ gas is not limited to the hydrocarbon gas generated within the process, but also includes hydrocarbon gas from any other source such as refinery, natural gas etc. The hydrocarbon gases and the $CO_2$ containing gases [12] get converted to synthesis gas [13] in the reformer. The catalyst from the reformer is returned to the regenerator and the catalyst flow is regulated through a catalyst slide valve [14]. The synthesis gas from the reformer is sent to a shift reactor for conversion of carbon monoxide to carbon dioxide and hydrogen through water gas shift reaction. The carbon dioxide, hydrogen and unconverted hydrocarbons are then sent to a Pressure Swing Adsorption (PSA) unit for hydrogen separation. The off gas from the PSA unit is sent back to the reformer.

In yet another embodiment, the source of $CO_2$ in the process of dry reforming of $C_1$ and $C_2$ hydrocarbon gases in the reformer is not limited to the PSA off gas. The $CO_2$ is outsourced or utilized from other process units.

Advantages of the Present Invention

The following are the technical advantages of the present invention:
  The production of hydrogen from Insitu dry reforming of the hydrocarbons generated from the cracking reactions by utilizing the same catalyst for cracking
  Producing high yield of light olefins from residue feedstocks having high metals and CCR
  Reduction of low value hydrocarbon fuel gas from the process due to Insitu conversion of fuel gas to high value hydrogen
  Easy integration for conversion of residue to petrochemicals.

EXAMPLES

The disclosure will now be illustrated with working examples, which is intended to illustrate the working of disclosure and not intended to take restrictively to imply any limitations on the scope of the present disclosure. Unless defined otherwise, all technical and scientific terms used herein have the same meaning as commonly understood to one of ordinary skill in the art to which this disclosure belongs. Although methods and materials similar or equivalent to those described herein can be used in the practice of the disclosed methods, the exemplary methods, devices, and materials are described herein. It is to be understood that this disclosure is not limited to particular methods, and experimental conditions described, as such methods and conditions may vary.

1. Generation of Light Olefins from Riser Reactor from Cracking Heavy Residue

The below example illustrates the total light olefins yield obtained from very heavy residue feedstock using the specific catalyst and specific operating condition. The experiments are conducted in a fixed bed micro reactor setup with a catalyst loading of 8 gm. The cracking experiments were carried out at a temperature of 620° C., WHSV of 60 $hr^{-1}$ and at two different metal levels on the equilibrium catalyst. The hydrocarbon feed used for cracking was reduced crude oil having a CCR of 10.1 wt %, sulphur content of 3.65 wt % and metal content (Ni+V) of 100 ppm.

TABLE 1

| Effect of coked catalyst on light olefin yield | | |
| --- | --- | --- |
| Experiment Reference No. | 1330 | 1416 |
| Metal on equilibrium catalyst (Ni + V), ppm | 10500 | 14000 |
| Ethylene, wt % on FF basis | 6.2 | 6.0 |
| Propylene, wt % on FF basis | 15.0 | 14.0 |
| Butylene, wt % on FF basis | 8.4 | 8.3 |
| Total Light Olefins, wt % on FF basis | 29.6 | 28.3 |

FF = Fresh feedstock

2. Dry Reforming of Hydrocarbons using the Equilibrium Catalyst

The below example illustrates conversion of hydrocarbon gas to synthesis gas. This experiment was conducted using methane as the hydrocarbon gas and pure $CO_2$ for conversion. The reaction mixture was diluted with 4:1 volume ratio of $N_2$ with respect to hydrocarbons. The experiments were carried out at two different temperatures with an 8-gm catalyst loading and a WHSV of 1.5 $hr^-$. The equilibrium catalyst had a metal level of (Ni+V) of 10500 ppm. The molar ratio of $CH_4$ and $CO_2$ was maintained at 1:1. The catalyst sample is reduced using methane at 100 ml/min for 10 minutes prior to carrying out dry reforming reactions. The below table shows that there is an appreciable conversion of hydrocarbons to syngas while performing the dry reforming reaction and a minimum of 80% of $CO_2$ is converted to synthesis gas.

TABLE 2

| Effect of temperature on synthesis gas production | | |
| --- | --- | --- |
| Temperature, ° C. | 725 | 800 |
| Methane Conversion to synthesis gas, wt % | 65.1 | 85.1 |
| $CO_2$ Conversion to synthesis gas, wt % | 80.1 | 93.6 |

3. Hydrogen Yield Estimation

The below example provides the yield of hydrogen that is obtained by dry reforming of hydrocarbons. In this example, methane has been considered as the model compound for demonstrating the estimation. For the heat balance estimation, the temperature in the reactor is 600° C., regenerator is 740° C. and reformer is 700° C.

TABLE 3

Estimation of Hydrogen Potential

| Item | Units | Values |
| --- | --- | --- |
| Fresh Feed, Basis | lb/hr | 100.0 |
| Coke yield | wt % | 15.0 |
| Net Heat demand from the reactor | Btu/lb | 770 |
| Combustion of Coke - Total Heat Release | Btu/lb Coke | 13410 |
| Dry Reforming heat demand | Btu/lb $CH_4$ | 6636.9 |
| Net Heat lost in the regenerator with flue gas (As percentage of heat released due to combustion of coke) | % | 23.5 |
| Net heat lost in the reformer (As percentage of heat released due to combustion of coke) | % | 6.3 |
| Other Heat Losses (As percentage of heat released due to combustion of coke) | % | 2.6 |
| Amount of $CH_4$ required to be Reformed | lb/hr | 9.24 |
| $H_2$ produced | % on FF | 4.62 |

Those of ordinary skill in the art will appreciate upon reading this specification, including the examples contained herein, that modifications and alterations to the composition and methodology for making the composition may be made within the scope of the invention and it is intended that the scope of the invention disclosed herein be limited only by the broadest interpretation of the appended claims to which the inventor is legally entitled.

DATE:
SIGNATURE:

The invention claimed is:

1. A process for conversion of a residue hydrocarbon feedstock having a feed CCR of more than 5 wt % into hydrogen and light olefins, the process consisting of:
    (a) cracking the residue hydrocarbon feedstock along with steam in a riser reactor in presence of a multifunctional micro spherical catalyst from a reformer to obtain a reaction mixture comprising cracked hydrocarbons, hydrocarbon gases, hydrogen, and a coked catalyst;
    (b) separating the coked catalyst and the cracked hydrocarbons obtained from step (a) at an end of the riser reactor and transferring the coked catalyst to a regenerator;
    (c) sending the cracked hydrocarbons obtained after separation in step (b) to a main fractionator for fractionation;
    (d) regenerating the coked catalyst of step (b) in an upper part of the regenerator by burning carbon, hydrogen, sulfur, metals, and nitrogen deposits on the coked catalyst in presence of oxygen containing gases to obtain a regenerated catalyst;
    (e) removing entrapped flue gas from the regenerated catalyst of step (d) at the lower part of the regenerator using $CO_2$ as a stripping medium to obtain a stripped catalyst;
    (f) transferring the stripped catalyst of step (e) to a reformer via a transporting pipe or a lift line using $CO_2$ as a lifting medium;
    (g) dry reforming the hydrocarbon gases to synthesis gas in the reformer using $CO_2$ and in presence of the stripped catalyst;
    (h) recirculating the catalyst from the reformer to the riser reactor and to the upper part of the regenerator; and
    (i) sending the synthesis gas from step (g) to a shift reactor for converting carbon monoxide in the synthesis gas to carbon dioxide and hydrogen through water gas shift reaction; wherein the carbon dioxide, hydrogen and unconverted hydrocarbons are sent to a Pressure Swing Adsorption (PSA) unit for hydrogen separation and off-gas from the PSA unit is recycled back to the reformer,
    wherein the cracked hydrocarbons consist of $C_2$ to $C_4$ olefins in a range of 20-40 wt % and total hydrogen yield is in a range of 2-6 wt % on a fresh hydrocarbon feedstock basis.

2. The process as claimed in claim 1, wherein the multi-functional micro spherical catalyst of step (a) consists of:
    5 to 15 wt % of ultra-stable Y zeolite;
    2-10 wt % of pentasil zeolite;
    1-5 wt % of active material;
    0.1-2 wt % of rare earth component; and
    60-85 wt % of support material,
wherein the wt % is based on the total weight of the catalyst.

3. The process as claimed in claim 1, wherein the cracking of residue hydrocarbon feedstock in step (a) is carried out at a temperature in a range of 550-650° C., a weight hourly space velocity (WHSV) in a range of 40-100 $hr^{-1}$, a catalyst to residue hydrocarbon feedstock ratio in a range of 10 to 25 wt/wt, a pressure in a range of 1 to 5 $kg/cm^2g$ and a steam to residue hydrocarbon feedstock ratio of 0.1 to 1.0 wt/wt.

4. The process as claimed in claim 1, wherein the dry reforming of hydrocarbon gases to synthesis gas in step (g) is carried out at a temperature in a range of 650-800° C. and WHSV in a range of 0.5-10 $hr^{-1}$.

5. The process as claimed in claim 1, wherein the hydrocarbon gases in step (g) comprise methane, and ethane.

6. The process as claimed in claim 1, wherein the catalyst from the reformer is recirculated to the riser reactor for cracking of hydrocarbons and to the upper part of the regenerator to control the regenerator catalyst temperature.

7. The process as claimed in claim 1, wherein a synthesis gas or a fuel gas is injected at a middle of the transporting pipe or the lift line of step (f) for reducing the oxidation state of metals present on the catalyst, wherein the fuel gas comprises methane and ethane.

8. The process as claimed in claim 1, wherein the regenerated catalyst is recirculated to the riser reactor for cracking of hydrocarbons and for stripping.

9. The process as claimed in claim 1, wherein the regenerator has 50 to 100° C. higher temperature compared to a temperature in the reformer.

* * * * *